United States Patent [19]

Bonn

[11] Patent Number: 4,749,482

[45] Date of Patent: Jun. 7, 1988

[54] MEMBRANE PLATE FOR PLATE FILTER PRESSES

[75] Inventor: Heinz Bonn, Kreuzau-Winden, Fed. Rep. of Germany

[73] Assignee: Eberhard Hoesch & Söhne GmbH, Düren, Fed. Rep. of Germany

[21] Appl. No.: 870,965

[22] Filed: Jun. 5, 1986

[30] Foreign Application Priority Data

Jun. 8, 1985 [DE] Fed. Rep. of Germany ....... 3520653

[51] Int. Cl.$^4$ ............................................. B01D 25/12
[52] U.S. Cl. .................... 210/231; 100/115; 100/211
[58] Field of Search ................ 100/115, 199, 211; 210/224, 225, 227, 228, 229, 230, 231

[56] References Cited

U.S. PATENT DOCUMENTS

3,656,622  4/1972  Heimbach et al. .................. 210/231
4,508,623  4/1985  Heckl et al. ..................... 210/231 X

FOREIGN PATENT DOCUMENTS

8402617  5/1984  Fed. Rep. of Germany .
1134025  11/1968  United Kingdom ................ 210/231
2157585  10/1985  United Kingdom ................ 210/231

*Primary Examiner*—Richard V. Fisher
*Assistant Examiner*—W. Gary Jones
*Attorney, Agent, or Firm*—Spencer & Frank

[57] ABSTRACT

A membrane plate to be assembled with further plates to form a filter press in which a respective filter chamber is formed between the membrane plate and each further plate adjacent thereto, the membrane plate includes a plate member composed of a plate wall portion having a peripheral region provided with a groove, and a continuous plate frame portion surrounding the plate wall portion and secured to the plate wall portion at the peripheral region, a flexible press membrane disposed adjacent the plate wall portion to be acted upon by a pressure medium, the membrane having a continuous bead extending around its periphery and seated in the groove, a retaining frame member disposed adjacent the bead and the periphery of the membrane at the side of the membrane directed away from the wall portion, and elements connecting the frame member to the plate frame portion for permitting movement of the frame member transverse to the plate wall portion between a first position in which the frame member presses the bead into the groove when the plate frame portion contacts an adjacent further plate and a second position in which the frame member protrudes beyond the plate frame portion when the adjacent further plate is out of contact with the plate frame portion.

10 Claims, 2 Drawing Sheets

MEMBRANE PLATE FOR PLATE FILTER PRESSES

BACKGROUND OF THE INVENTION

This invention relates to a membrane plate for a plate filter press composed of a plurality of such plates. Each plate has a plate wall with a continuous plate frame which, together with adjacent filter plates on both sides of the plate, defines a chamber. A press membrane that can be acted upon by a pressure medium is disposed on at least one side of the plate. The press membrane has a continuous peripheral bead which is fixed in a groove in a transitional zone between the plate frame and the plate wall.

A membrane plate of the above type is described in German Utility Model Patent DE-GM No. 84 02 617.0. In this known membrane plate, the peripheral bead has a dovetail-like cross section, anchored in a form-fitting manner in a groove that also has a dovetail-like cross section. The portion of the peripheral bead that is joined to the edge of the membrane protrudes slightly beyond the plane defined by the contact face of the plate frame, when the chamber is open. The filter cloth is located on either side, facing the chamber, covering both the contact face of the plate frame and the entire press membrane. When the chamber is closed, the peripheral bead is pressed into the dovetail-like groove and deformed such that the contact faces of the frame, or the filter cloths resting on the frame, are pressed against one another by the closing force of the press.

This kind of fastening has certain disadvantages. Firstly, mounting a press membrane, or removing a worn press membrane, can be done only by exerting considerable force because of the form-fitting fixation of the peripheral bead in the groove, and there is always the danger that if tools are used, the peripheral bead will be nicked and, given the considerable deformation that occurs, this becomes the beginning of an ever-enlarging fissure.

A further disadvantage is that when the filter plates are pressed against one another, the portion of the peripheral bead that is anchored in the groove cannot deflect into the groove to a sufficient extent. Therefore, in the course of the resulting laterally deflecting deformation toward the press membrane, localized shear strains can arise even in the elastic material of which the press membrane is made, which is typically rubber. These strains can exceed the permissible limits of the rubber material.

Still another disadvantage of this known press membrane, which has a cup-shaped form, is that for the pressing operation the press membrane is inverted into the chamber, and so, because of the resultant changes in its original geometry in the transitional zone between the clamped portion and the exposed surface of the membrane, the rubber material is subjected not only to the shear strains already mentioned, but also to tensile and compressive strains. The service life of the press membrane is shortened as a result.

SUMMARY OF THE INVENTION

It is an object of the invention to overcome the above disadvantages by improving the connection between the press membrane and the membrane plate and by improving the goemetrical relationships in the transitional zone.

In accordance with the invention, this object is attained in that the press membrane is, along with its peripheral bead, covered by a retaining frame on the side oriented toward the adjacent plate, the retaining frame being structurally separate from the press membrane and being secured to the plate edge such that it is movable to a limited extent at right angles to the plane of the plate; and in that the retaining frame protrudes beyond the plane defined by the contact face of the frame, when the chamber is open.

This arrangement has the advantage that a cross-sectional shape without any undercut can now be provided for both the peripheral bead and the associated groove. Thus a press membrane can be mounted simply by placing the peripheral bead into the groove, because the likewise form-fitting securing of the peripheral bead against falling out is effected by the retaining frame when the frame is in place.

Since the retaining frame is joined to the plate frame such that the frame is movable at right angles to the plane of the plate, then when the chamber is open the peripheral bead can be retained in the groove either loosely or with only slight biasing. That is, the material making up the peripheral bead is not compressed by the movable retaining frame until the filter plate package is closed. The degree of deformation is unequivocally defined by the extent to which the retaining frame protrudes beyond the plane defined by the contact face of the plate frame.

As soon as the chamber is reopened, the material of the peripheral bead can relax again, so that, given the relatively long periods of time when the chamber is open during the operation of a plate filter press of this kind, the material of the peripheral bead can recover.

Furthermore, since the retaining frame also covers a portion of the adjoining edge of the membrane, adequate sealing of the pressure chamber located between the plate wall and the diaphragm is attained when the chamber is closed, and this makes it possible to apply very high pressing forces to the membrane.

A further advantage of embodiments according to the invention, as compared with filter plates of the prior art, is that when the chamber is closed, the filter cloth is not pressed against the material of which the membrane is made, but only on the much stronger material of which the retaining frame is made. Thus, once again, the danger of localized excessive strains, which could cause fissures, is avoided.

According to a preferred embodiment of the invention, the peripheral bead is so dimensioned in cross section that when the chamber is open, the bead does not completely fill up the cross section of the groove. This has the advantage that when the chamber is closed, the material of the peripheral bead can deform into the groove, resulting in unequivocally defined deformation and strain conditions in the bead material in this region.

According to a further feature of the invention, when the chamber is open, the peripheral bead rests at least partly on the groove bottom, when seen in cross section. This enables clamping the peripheral bead in place via the retaining frame with only slight biasing, yet still leaving sufficient free space for further deformation of the material of the peripheral bead into the inside of the groove. In its region oriented toward the groove bottom, the peripheral bead may have an approximately semicircular cross section, while the groove itself has a rectangular cross section.

In further accordance with the invention, the retaining frame is provided with recesses on its circumferential face, and the plate frame is provided with resiliently supported locking pins on its edge oriented toward the circumferential face of the retaining frame. These locking pins engage the recesses and limit the movement of the retaining frame at right angles to the plane of the plate. As a result, for the surface of the retaining frame located in the plane of the contact face of the plate frame, a likewise closed surface is attained, thereby assuring satisfactory sealing of the individual chambers when the filter plate package is closed. The recesses have a larger cross section at right angles to the plane of the plate, or in other words in the direction of movement of the retaining frame, than do the locking pins, so that when the chamber is closed the retaining frame is capable of moving freely toward the peripheral bead in accordance with the predetermined extent of protrusion. The locking pins here need be only large enough to be capable of maintaining the desired biasing of the peripheral bead when the chamber is open. This permits easy mounting and also easy removal of membranes, because when the membrane is mounted, the retaining frame needs to be pressed on only to such an extent that the locking pins snap into place. For removal, the locking pins must be removed from their locking engagement in the recess in accordance with their construction.

According to preferred embodiments of the invention, the recess is a continuous groove extending around the circumferential face of the retaining frame. A continuous groove of this kind not only facilitates the installation of the locking pins required for securing the retaining frame, but also has further advantages in terms of filtration technology, because with the aid of this continuous groove, satisfactory drainage of liquid in the peripheral region of the filter cake is also assured. In filter presses having vertically oriented filter plates, this applies to the lower portion, while in plate filter presses having horizontally oriented filter plates, the drainage of liquid is augmented over virtually the entire peripheral region.

Further, in preferred embodiments of the invention, bores extending approximately coaxially with the locking pins are disposed on the retaining frame and have a smaller cross section than the locking pins. This feature offers a considerable simplification in terms of the construction and manipulation of the locking pins. All that is needed is to dispose simple bores in the plate frame on the inside edge thereof, oriented toward the outer circumference of the retaining frame, and to insert a rubber plug, as a spring or resilient element, into the bores. A cylindrical pin made of metal is then slipped onto the rubber plug so that the end of the pin protrudes from the bore. In disposing the bore, care must be taken only that, here again, sufficient free space for deformation is available, in accordance with the required path of movement of the pin. Since the bores extending coaxially with the locking pins have a smaller diameter than the locking pins, the locking pins cannot fall out once the retaining frame is pressed into place. On the other hand, all that is needed to loosen the snap connection is to press each locking pin back with a tool via the bore, counter to the force of the spring, so that the retaining frame is then lifted out, or presssed upward under the force of the biasing of the peripheral bead of the press membrane.

In further accordance with preferred embodiments of the invention, adjoining the peripheral bead the press membrane is provided with a continuous bulge oriented toward the chamber, and a correspondingly continuous bulge of the plate wall is associated with this bulge of the press membrane. The rising portion of the bulge immediately adjacent to the peripheral bead is covered by a correspondingly obliquely extending surface of the retaining frame, spaced apart slightly therefrom, when the chamber is open. Since, in any event, because of the manner of securing the press membrane via an additional retaining frame according to the invention, the peripheral bead is located approximately in the plane of the plate surface, the resultant shapes of the press membranes, even when the chamber depths are very great, are nevertheless only very slightly cup-shaped. If the peripheral region of the press membrane directly adjoining the retaining frame is provided with a bulge, as mentioned above, then the strain on this peripheral region is very much more favorable and unequivocally defined when the apparatus is operated with pressure exerted on the press membrane from the back with a pressure medium that presses the press membrane forward into the chamber space. Undefinable multi-axial strain conditions are avoided, so that very much greater pressing forces can be applied while using the conventional material thicknesses for such press membranes; the result is a very much more compressed, and hence drier, filter cake. Because a correspondingly obliquely extending surface is provided on the retaining frame, with the distance by which it is spaced apart from the associated surface of the press membrane corresponding to the play in movement of the retaining frame, the material of the press membrane is compressed virtually not at all in this region when the chamber is closed, so that when the pressure medium is imposed, the material of the press membrane is not "pulled on one edge".

Further according to preferred embodiments of the invention, in the apical region of the bulge of the press membrane, on the side facing the chamber, a supporting bead is provided extending continuously parallel to the inner edge of the retaining frame. As the press membrane is somewhat everted upon being subjected to the pressure medium, this supporting bead presses against the retaining frame, thereby limiting the movement of the press membrane in this region, so that as the filter cake becomes increasingly compressed, the remaining deformation shifts from the securing edge of the press membrane toward the interior.

In suitable embodiments of the invention, the supporting bead is provided with grooves extending radially with respect to the plate edge, and approximately coaxial bores in the retaining frame are associated with these grooves, the bores opening into the groove in the circumferential face of the retaining frame. As a result of the grooves in the supporting bead and the bores associated with them, satisfactory drainage of liquid is assured in the peripheral region as well.

BRIEF DESCRIPTION OF THE DRAWING

The invention will now be described in further detail, with reference to exemplary embodiments shown in schematic fashion in the drawings.

DESCRIPTION OF THE PREFERRED EMBODIMENTS

Figure 1:
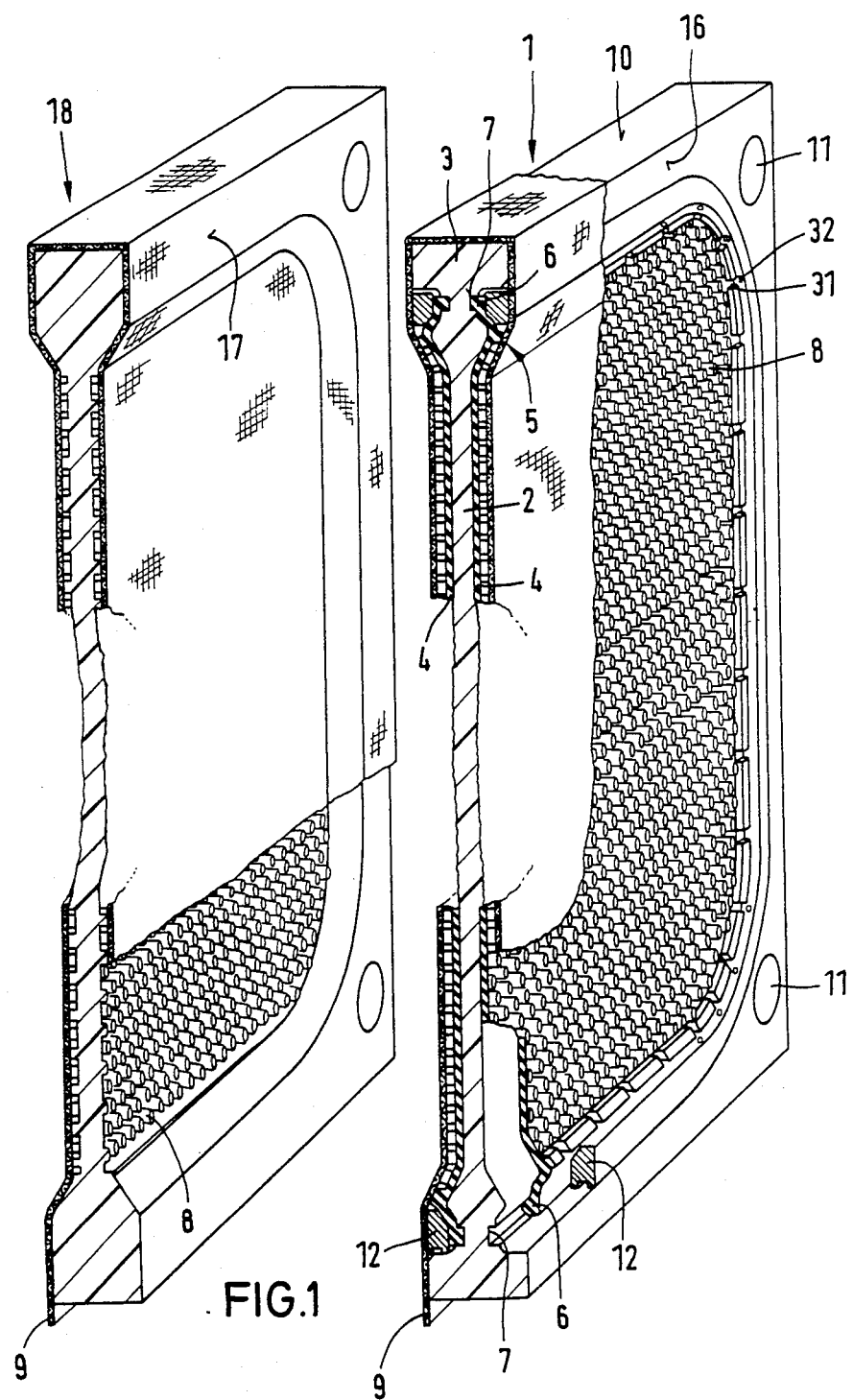
FIG. 1 is a perspective, partially cut-away view of a membrane plate with a double membrane and an adjacent filter plate.

The membrane plate 1 shown in FIG. 1, for a plate filter press having vertically oriented filter plates, has a plate wall 2 which is provided with a continuous plate frame 3. Plate frame 3 is so dimensioned, in terms of its thickness, that it protrudes beyond both faces of plate wall 2. A plurality of such membrane plates 1, disposed adjacent to one another or in alternation with simple filter plates lacking a membrane, or in alternation with simple frames, together make up the filter plate package of a filter plate press, with a filter chamber being formed between each adjacent pair of filter plates. Depending on how the filter press is to be constructed, membrane plates of this kind may also be provided with a membrane on only one side, an alternative which is adopted particularly in plate filter presses having horizontally oriented filter plates.

In the illustrated embodiment, a respective press membrane 4 rests on each side of plate wall 2 and each membrane 4 is fixed in a transitional zone 5 between the plate frame 3 and the plate wall 2 by means of a peripheral bead 6 seated in a groove 7. Each press membrane 4, made of a suitable elastic material, such as an appropriate type of rubber, is provided on each face remote from the plate wall 2 with a multiplicity of knob-like protrusions 8, which support a filter cloth 9 that is laid over them. In the exemplary embodiment shown, filter cloth 9 is hung over the upper edge 10 of the plate frame 3, draped over both membranes 4, and provided at appropriate points with through openings (not shown) that correspond with channel bores 11 in plate frame 3. The middle portion of the filter plate is not shown in the drawing, because depending on its construction the plate may have either a closed surface here, or a suitable orifice fixture to provide drainage of waste liquid from the center. In any event, this region will be formed in a suitable manner known in the art, and the manner in which this is done is of no significance in terms of understanding the construction according to the invention.

As will now be described with reference to the larger scale detail views of FIGS. 2 and 3, the peripheral bead 6 of a press membrane 4 is secured by a retaining frame 12, which is held on the plate frame 3 via appropriate securing means such that it is movable back and forth at right angles to the plane of plate 2. As the drawing shows, the filter cloth 9 covers both the plate frame 3 and the retaining frame 12.

Figure 2:
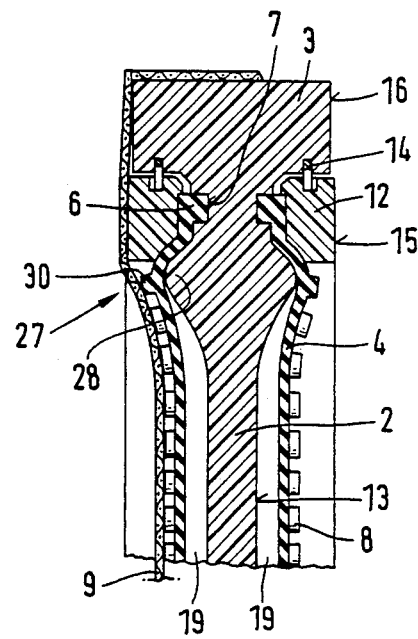
FIG. 2 is a cross-sectional detail view of the peripheral securing of the membrane of FIG. 1, to an enlarged scale.

As shown by the enlarged illustration in FIG. 2, the groove 7 for receiving the peripheral bead 6 of the press membrane is located approximately in the plane of the outer surface 13 of plate wall 2. In the vicinity of the peripheral bead 6, the press membrane 4 is covered by the retaining frame 12, which is secured via suitable securing means 14, preferably locking pins described in further detail below and embodied as snap closures.

Securing means 14 are constructed such that they press retaining frame 12 against peripheral bead 6, while compressing the peripheral bead 6 only slightly when the chamber is open. This operating state is shown in FIG. 2. Here the plane of the outer surface 15 of retaining frame 12 protrudes beyond the plane of the outer side surface 16 of plate frame 3, surface 16 serving as a contact face of the plate frame 3. The difference in height between the plane of surface 16 and the plane of surface 15 is predetermined here such that when the contact face 17 of an adjacent plate 18, which is also shown in FIG. 1 and is embodied as purely a filter plate, is pressed upon the facing surfaces 15 and 16 of plate 1, the desired deformation of the peripheral bead 6 is attained, so that when the chamber is closed the surfaces 15 and 16 are located in a common plane. As a result, the pressure chamber 19 located between plate wall 2 and a membrane 4 is sealed at the edge, and in turn the maximum permissible pressing force for the pressure medium that is to be introduced into the pressure chamber 19 is determined by the sealing force that results from the defined deformation of the peripheral bead 6, together with the predetermined wall thickness of press membrane 4.

As soon as the filter chamber is opened, peripheral bead 6 can relax virtually completely, except for its slight biasing. The material making up the peripheral bead can "recover" during the period the chamber is open.

In FIG. 2 filter cloth 9 has been omitted on one side for the sake of simplifying the drawing.

Figure 3:
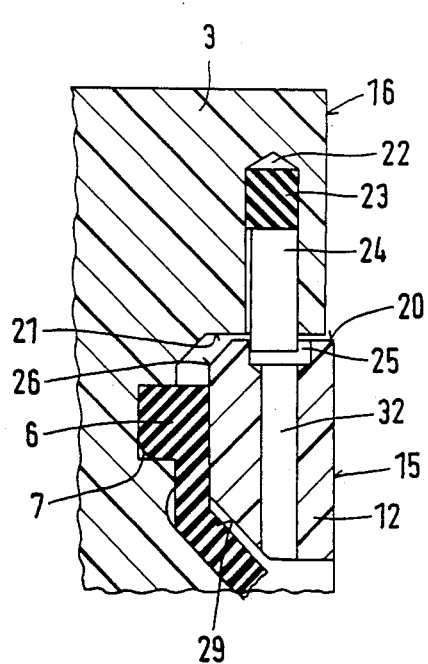
FIG. 3 is a cross-sectional view showing the securing means for the retaining frame of FIG. 1.

In FIG. 3, which is to a larger scale than FIG. 2, one embodiment of an arrangement for connecting plate frame 3 and retaining frame 12 is shown in a sectional view. In this embodiment, radially oriented receiving bores 22, for example two each per side of the plate, are distributed at equal intervals along the circumference of the surface 21 of plate frame 3 which faces the cicumferential face 20 of retaining frame 12, and a rubber plug 23 acting as a spring element is loosely inserted into each bore 22. A pin 24 is then inserted into each bore 22 to bear against rubber plug 23 and the outer end of each pin 24 protrudes beyond the surface 21. Because rubber plug 23 is inserted loosely into bore 22, a sufficient volume of space is available to compress the rubber plug, by means of an external force exerted axially upon pin 24, and thereby press pin 24 into bore 22. As soon as this force is lessened, the pin 24 resiliently returns to its original position.

In its circumferential face 20, retaining frame 12 is provided with a continuous groove 25 and with a chamfer 26 on its side facing groove 7 for peripheral bead 6. During installation of frame 12, chamfer 26 exerts an axial displacement force on each pin 24, which then snaps into place in groove 25. Groove 25 is dimensioned such that in the locked-in position of frame 12, as shown in FIG. 3, peripheral bead 6 is compressed only very slightly.

The width of groove 25 is greater than the diameter of pin 24, so that when the filter chamber is closed, surface 15 of retaining frame 12 can be pressed inwardly, toward groove 7, as peripheral bead 6 is simultaneously being deformed, to the level of surface 16 of plate frame 3. In this process, peripheral bead 6, which has a smaller cross section than groove 7, is deformed into groove 7, thereby attaining a satisfactory sealing of the press membrane on its back side, that is, on the side of its associated pressure chamber 19.

As shown particularly in FIG. 2, press membrane 4 is provided, adjacent peripheral bead 6, with a continuous bulge 27 oriented toward the associated filter chamber; a correspondingly continuous bulge 28 of the plate wall 2 is associated with each bulge 27. As shown in FIG. 3, frame 12 has, in the region immediately adjacent peripheral bead 6, an obliquely extending face 29 which overlies an associated surface portion of press membrane 4 in a spaced apart manner in the vicinity of bulge 27 when the associated filter chamber is open. If the filter chamber is closed and retaining frame 12 is pressed downward so that surfaces 15 and 16 are coplanar, then although peripheral bead 6 and the immediately adjoining region of membrane 4 do become deformed, the zone of press membrane 4 that is covered by the obliquely extending surface 29 undergoes virtually no further deformation. As a result, not only is a defined compression of peripheral bead 6 attained, but also the forces that must be brought to bear in this region in order to deform press membrane 4 are minimized.

As shown in FIG. 2, when a pressure chamber 19 receives a pressure medium, press membrane 4 is everted forward into the associated filter chamber space. To reduce the strains in the membrane material in the peripheral region of membrane 4, which is already under great strain from the stresses created by the clamping forces, a circumferential supporting bead 30 is provided in the apical region of bulge 27; on the side facing the associated filter chamber, parallel, and adjacent, to the inner edge of retaining frame 12, which inner edge faces toward the interior of the associated filter chamber If, during a pressing process, membrane 4 is subjected fully to pressure medium and is everted far into the associated filter chamber, then approximately at the instant when membrane 4 in the vicinity of plate 2 extends parallel thereto, supporting bead 30 comes into contact with the inner edge of retaining frame 12 and thereby limits movement of membrane 4 in this region. Further deformation of press membrane 4, as compression continues, then takes place at a still greater distance from the securing edge of press membrane 4, so that critical strains on press membrane 4 in its particularly vulnerable peripheral region are generally avoided.

Supporting bead 30 can, but need not, be continuous. As shown in FIG. 1, that bead can be interrupted at regular intervals by grooves 31 extending radially with respect to the plate edge. Frame 12 is provided with bores 32, as shown in FIGS. 2 and 3, each bore 32 being aligned with a respective groove 31. Each bore 32 opens into groove 25 extending continuously along the peripheral region of retaining frame 12. Certain ones of bores 32 are aligned with pins 24 so that a tool can be inserted through those bores to depress pins 24 and release the snap connection. All the other grooves 31 and bores 32 serve to enable drainage of liquid in the peripheral zone as well, and thereby to assure a virtually complete pressing of liquid from the filter cake. The above-described supporting action of the supporting bead 30 is not impaired by the presence of grooves 31.

It will be understood that the above description of the present invention is susceptible to various modifications, changes and adaptations, and the same are intended to be comprehended within the meaning and range of equivalents of the appended claims.

What is claimed is:

1. A membrane plate to be assembled with further plates to form a filter press in which a respective filter chamber is formed between said membrane plate and each further plate adjacent thereto, said membrane plate comprising: a plate member composed of a plate wall portion having a peripheral region provided with a groove, and a continuous plate frame portion surrounding said plate wall portion and secured to said plate wall portion at said peripheral region, said plate frame portion having a lateral surface via which said membrane plate bears against an adjacent further plate in the assembled condition of the filter press; and a flexible press membrane disposed adjacent said plate wall portion to be acted upon by a pressure medium, said membrane having a continuous bead extending around its periphery and seated in said groove, wherein: said membrane plate further comprises a retaining frame member disposed adjacent said bead and the periphery of said membrane at the side of said membrane directed away from said wall portion, said retaining frame member being peripherally enclosed, at least partially, by said plate frame portion, and said retaining frame member having a lateral surface substantially parallel to said lateral surface of said plate frame portion and facing away from said membrane; and means connecting said frame member to said plate frame portion for permitting movement of said frame member transverse to said plate wall portion between a first position in which said frame member presses said bead into said groove when said lateral surface of said plate frame portion bears against the adjacent further plate and said lateral surface of said retaining frame member is in a common plane with said lateral surface of said plate frame portion, and a second position in which said frame member protrudes beyond said lateral surface of said plate frame portion when the adjacent further plate is spaced from said lateral surface, and wherein said retaining frame member is structurally separate from said flexible press membrane and is constructed to permit high pressing forces to be applied to said press membrane.

2. A membrane plate as defined by claim 1 wherein said peripheral bead is so dimensioned in cross section that when said frame member is in said second position, said bead does not completely fill up the cross section of said groove.

3. A membrane plate as defined by claim 2 wherein when said frame member is in said second position, said peripheral bead rests at least partly on the groove bottom when viewed in cross section.

4. A membrane plate as defined in claim 1 wherein: said membrane is provided with a continuous bulge adjacent and contiguous with said bead and protruding away from said plate wall portion so that the portion of said membrane immediately adjacent said bead slopes away from said plate wall portion; said plate wall portion is provided with a continuous bulge aligned with said continuous bulge of said membrane; and said frame member has a sloping surface which faces said portion of said membrane immediately adjacent said bead and located to be spaced a slight distance from said portion of said membrane immediately adjacent said bead when said frame member is in said second position.

5. A membrane plate as defined in claim 4 wherein said frame member has an interior peripheral surface, said bulge of said membrane has an apex, and said membrane further comprises a supporting bead located at said apex, protruding from the side of said membrane which is directed away from said plate wall portion, and extending parallel, and adjacent, to said interior peripheral surface of said frame member.

6. A membrane plate as defined in claim 1 wherein said groove in said plate wall portion has a rectangular cross section.

7. A membrane plate to be assembled with further plates to form a filter press in which a respective filter chamber is formed between said membrane plate and each further plate adjacent thereto, said membrane plate comprising: a plate member composed of a plate wall portion having a peripheral region provided with a groove, and a continuous plate frame portion surrounding said plate wall portion and secured to said plate wall portion at said peripheral region, said plate frame portion having a lateral surface via which said membrane plate bears against an adjacent further plate in the assembled condition of the filter press; and a flexible press membrane disposed adjacent said plate wall portion to be acted upon by a pressure medium, said membrane having a continuous bead extending around its periphery and seated in said groove, wherein: said membrane plate further comprises a retaining frame member disposed adjacent said bead and the periphery of said membrane at the side of said membrane directed away from said wall portion, said retaining frame member being peripherally enclosed, at least partially, by said plate frame portion; and means connecting said frame member to said plate frame portion for permitting movement of said frame member transverse to said plate wall portion between a first position in which said frame member presses said bead into said groove when said lateral surface of said plate frame portion bears against the adjacent further plate and a second position in which said frame member protrudes beyond said lateral surface of said plate frame portion when the adjacent further plate is spaced from said lateral surface, and wherein: said plate frame portion has an interior peripheral surface and said frame member has an exterior peripheral surface facing said interior peripheral surface of said plate frame portion; said frame member is provided with at least one recess in said exterior peripheral surface; and said means connecting said frame member to said plate frame portion comprise a plurality of locking pins resiliently supported in said plate frame portion and protruding from said interior surface of said plate frame portion to engage in said recess in said exterior peripheral surface of said frame member for permitting limited movement of said frame member between the first and second positions.

8. A membrane plate as defined in claim 7 wherein said at least one recess is constituted by a continuous groove in said exterior peripheral surface of said frame member.

9. A membrane plate as defined in claim 7 wherein said frame member is provided with a plurality of through bores each extending to said at least one recess and at least approximately aligned with a respective one of said locking pins, each said through bore having at least one transverse dimension which is smaller than the corresponding transverse dimension of said respective locking pin.

10. A membrane plate to be assembled with further plates to form a filter press in which a respective filter chamber is formed between said membrane plate and each further plate adjacent thereto, said membrane plate comprising: a plate member composed of a plate wall portion having a peripheral region provided with a groove, and a continuous plate frame portion surrounding said plate wall portion and secured to said plate wall portion at said peripheral region, said plate frame portion having a lateral surface via which said membrane plate bears against an adjacent further plate in the assembled condition of the filter press; and a flexible press membrane disposed adjacent said plate wall portion to be acted upon by a pressure medium, said membrane having a continous bead extending around its periphery and seated in said groove, wherein: said membrane plate further comprises a retaining frame member disposed adjacent said bead and the periphery of said membrane at the side of said membrane directed away from said wall portion, said retaining frame member being peripherally enclosed, at least partially, by said plate frame portion; and means connecting said frame member to said plate frame portion for permitting movement of said frame member transverse to said plate wall portion between a first position in which said frame member presses said bead into said groove when said lateral surface of said plate frame portion bears against the adjacent further plate and a second position in which said frame member protrudes beyond said lateral surface of said plate frame portion when the adjacent further plate is spaced from said lateral surface wherein: said frame member has an exterior peripheral surface facing said plate frame portion, an interior peripheral surface facing away from said exterior peripheral surface, a continuous peripheral groove in said exterior peripheral surface, and a plurality of through bores extending from said groove to the interior peripheral surface of said frame member; and said membrane further comprises a supporting bead located at said apex, protruding from the side of said membrane which is directed away from said plate wall portion, and extending parallel, and adjacent, to said interior peripheral surface of said frame member, and said supporting bead has a plurality of grooves each aligned with a respective one of said through bores.

* * * * *